UNITED STATES PATENT OFFICE.

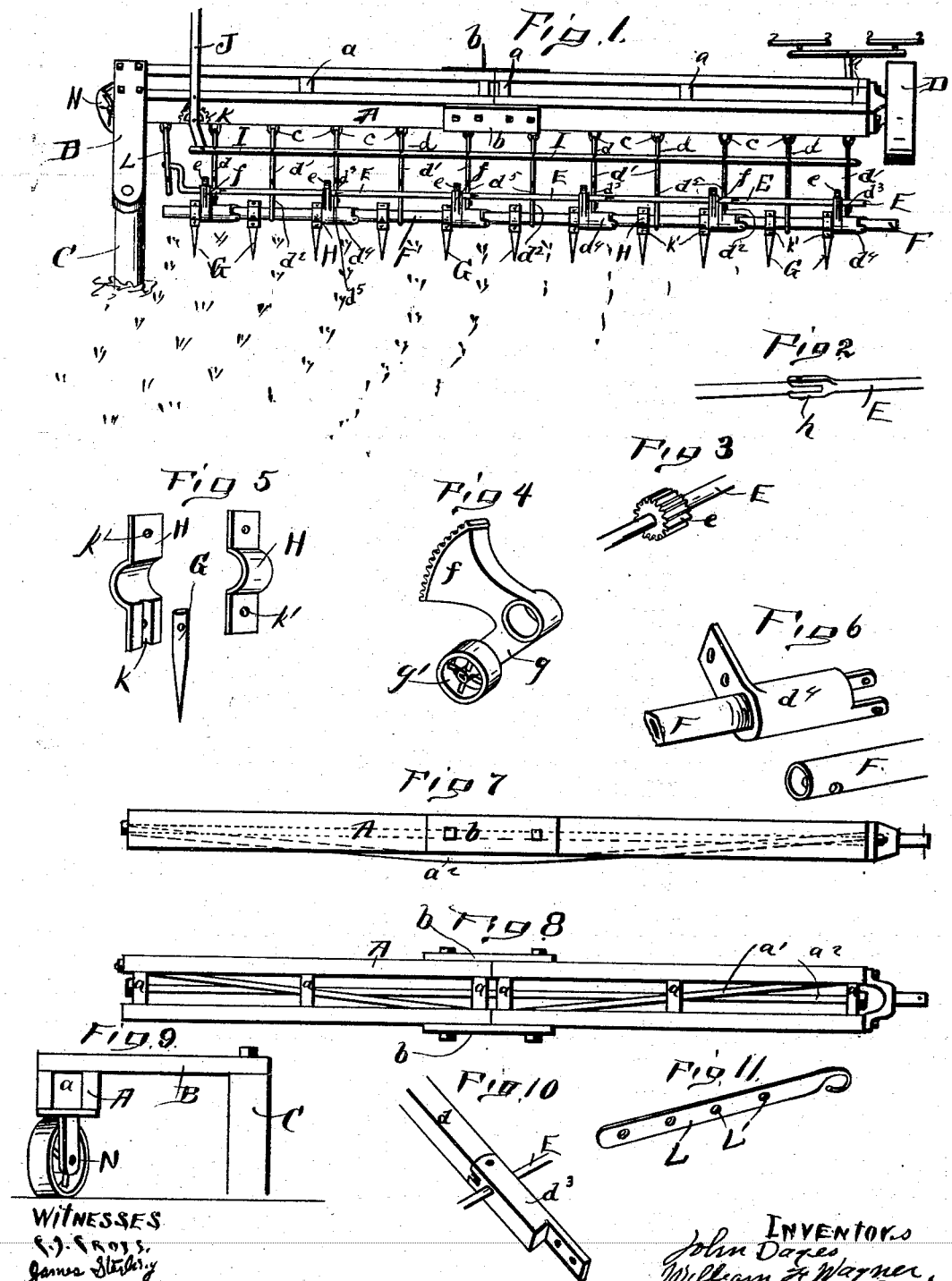

JOHN DAGES, OF NAVARRE, OHIO, AND WILLIAM F. WAGNER, OF ROCKVILLE, MARYLAND.

TILLING-MACHINE.

SPECIFICATION forming part of Letters Patent No. 503,696, dated August 22, 1893.

Application filed February 20, 1893. Serial No. 462,992. (No model.)

*To all whom it may concern:*

Be it known that we, JOHN DAGES, a resident of Navarre, in the county of Stark and State of Ohio, and WILLIAM F. WAGNER, a resident of Rockville, in the county of Montgomery and State of Maryland, citizens of the United States, have invented certain new and useful Improvements in Tilling-Machines; and we do hereby declare that the following is a full, clear, and exact description of the same, reference being had to the annexed drawings, making a part of this specification, and to the letters of reference marked thereon, in which—

Figure 1, is a perspective view showing the different parts properly located and arranged. Fig. 2, is a view showing a portion of the crank shaft and one of its joints. Fig. 3, is a view showing a portion of the crank shaft and one of the pinions located thereon. Fig. 4, is a detached view of one of the segments and its wheel arm, showing the wheel properly journaled thereto. Fig. 5 is a detached view of one of the teeth and its clamps. Fig. 6, is a view showing a portion of the tooth bar and its joint. Fig. 7, is an edge view of the sweep. Fig. 8, is a top view of the sweep. Fig. 9, is a view showing the connecting arm and its traveling wheel. Fig. 10, is a detached view showing a portion of one of the connecting bars, and a portion of the crank shaft. Fig. 11, is a detached view of the crank shaft retaining bar or catch.

The present invention has relation to tilling machines, and it consists in the different parts and combination of parts hereinafter described and particularly pointed out in the claims.

Similar letters of reference indicate corresponding parts in all the figures of the drawings.

The object of the present invention is to prepare the ground for the cultivation of plants, and the device can be used for the various steps necessary for the planting and raising of plants and vegetables; and in use, a center post is properly anchored at or near the center of the field designed and calculated to be cultivated, and the plants or vegetables sown and cultivated in circles, the diameter of the circles increasing from the center to the circumference.

In the accompanying drawings A represents the sweep which is substantially of the form shown in the drawings, and as shown it consists of two parallel bars properly secured together by means of the cross blocks $a$. The sweep is preferably formed in sections, and the sections united together by means of the plates $b$ or their equivalents, which plates are preferably located upon the sides of the sweep proper, substantially as illustrated in the drawings.

To one end of the sweep A is securely attached in any convenient and well known manner the bar B, which bar extends a short distance rearward, and its rear end journaled to the top or upper end of the post C, which post is securely seated in the ground.

The object and purpose of forming the sweep A, in sections, is to provide a means for detaching the sweep sections for the purpose of transporting the machine proper from place to place.

To the outer end of the sweep A, is journaled the traveling wheel D, which traveling wheel is for the purpose of carrying the weight of the sweep. To the rear side of the sweep A, are attached the eyes or staples $c$, which eyes or staples are for the purpose of pivotally connecting the front or forward ends of the connecting bars $d$ and $d'$, said connecting bars extending rearward, and their ends provided with the hinged sections $d^2$, and $d^3$. The hinged sections $d^3$, are provided upon their rear ends with the joint sections $d^4$, which joint sections are substantially of the form shown in the drawings, in Fig. 6. To the joint sections shown in Fig. 6, are connected the bars $d^5$, which bars are pivotally connected to the rear ends of the bars $d$. To the bars $d^5$, is journaled the crank shaft E, which crank shaft is located and arranged substantially as shown in Fig. 1. The crank shaft E, is provided with the pinions $e$, which pinions mesh with the segments $f$, said segments being located and arranged substantially as shown in Fig. 1. The segments $f$ are loosely mounted upon the toothed shaft F. The segments $f$, are provided with the downwardly projecting arms $g$, to the lower ends of which are journaled the traveling wheels $g'$.

For the purpose of causing the tooth shaft F, to conform to any unevenness of the ground, said shaft is formed in sections and the sections joined together by means of the hinges $h$. For the purpose of causing the shaft E, to follow the movements of the tooth bar sections, said shaft is jointed as illustrated in Fig. 1, the joints being located directly opposite the joints formed in the tooth bar F. To the tooth bar F, are securely clamped the teeth G, by means of the clamping plates H, which clamping plates are substantially of the form shown in Fig. 5, and as shown, they are so formed that they will embrace the tooth bar F.

For the purpose of securely holding the teeth G, in proper position, the bottom or lower ends of the plates H, are provided with the grooves $k$, which grooves receive the top or upper ends of the teeth G. It will be understood that by clamping the teeth to the bar F, as above described, the clamping bolts $k'$, can be loosened, and the teeth adjusted or moved longitudinally upon the bar F, thereby adjusting said teeth for different kinds of work, or for the cultivation of different kinds of vegetables. In the drawings one tooth is shown located between each row; but it will be understood that the number of teeth between the rows may be increased, without departing from the nature of our invention. When it is desired to change the height of the tooth bar F, the crank shaft E is rotated, which movement communicates movement to the tooth segments $f$, by means of the pinions $e$. It will be understood that as the crank shaft E is rotated in one direction, the arms $g$, together with their traveling wheels $g'$ will be elevated, which permits the bar F, together with its teeth to come nearer to the ground; and when the crank shaft E is rotated in the opposite direction, the arms $g$, together with their traveling wheels $g'$, will be moved under the shaft bar F, thereby elevating said bar, together with its teeth. It will be understood that different kinds of teeth can be attached to the bar F, as for instance, cultivating shovels or rakes may be attached to said bar, in place of the teeth shown, the kind of tools to be attached to the bar F, corresponding with the kind of work it is designed to have the machine perform. To the bars $d$, and $d'$ is pivotally attached the rod or bar I, to one end of which bar or rod is pivotally attached the lever J, which lever is pivotally attached to the sweep A substantially as illustrated in Fig. 1. For the purpose of holding the lever J, at any desired point of adjustment, the tooth segment K is provided, which tooth segment is secured to the sweep A. It will be understood that as the lever J is moved in one direction, the tooth bar F, will be moved longitudinally by means of the bar or rod I, and the rods or bars $d$.

The object and purpose of providing a means for moving the bar F, longitudinally, is to adjust the teeth G or their equivalents to or from the rows of growing vegetables. For the purpose of holding the shaft E, against rotation when the machine is in use, the bar L, is provided, which bar may be pivotally connected to the sweep A, and as shown it is provided with a series of apertures $L'$, which apertures engage the crank M, substantially as illustrated in Fig. 1. For the purpose of preventing the sweep A, from tilting, the traveling wheel N is provided, and is located substantially as shown in the drawings. For the purpose of bracing the sweep A, the brace rods $a'$ and $a^2$, are provided, and are located and adjusted substantially as shown in the drawings. It will be understood that the rods $d'$, may be extended past and beyond the tooth bar F, if so desired, and teeth secured to the rear ends thereof.

In use the tilling machine is placed in proper operating position, after which the tools desired to be used in cultivating the ground or plants are attached.

The machine is very useful in the cultivation of small fields and more especially for garden purposes. It will be understood that by forming the sweep A in sections the sections can be detached one from the other which enables it to be transported from place to place and at the same time remove sections from a field or bed of growing plants without injury to vegetation. It will be understood that a post is to be located at the center of each distinct field or bed to which post the pivoted section of the sweep is to be attached.

Having fully described our invention, what we claim as new, and desire to secure by Letters Patent, is—

1. The combination of the sweep A, the bar B, the post C, the connecting bars $d$ pivotally attached to the sweep A, the hinged sections $d^2$, and $d^3$, the joint sections $d^4$, the tooth bar F, formed in sections, and the crank shaft E, formed in sections, the pinions $e$, the segments $f$, provided with the arms $g$, and the traveling wheels $g'$, substantially as and for the purpose specified.

2. The combination of the sweep A, the connecting bar B, the tooth bar F, having adjustably attached thereto the teeth G or their equivalents, the hinged connecting bars $d$, the connecting bar or rod I, and the lever J, substantially as and for the purpose specified.

3. The combination of the sweep A, pivotally connected to the post C, the traveling wheel N, the crank shaft E, provided with the pinions $e$, the segments $f$, provided with the arms $g$, the traveling wheels $g'$, and means for holding the shaft E, against rotation, substantially as and for the purpose specified.

4. The combination of the sweep A, the connecting bar B, the tooth bar F, the plates H, provided with the grooves $k$, and the teeth G, substantially as and for the purpose specified.

In testimony that we claim the above we have hereunto subscribed our names in the presence of two witnesses.

JOHN DAGES.
WILLIAM F. WAGNER.

Witnesses:
LAURA SHAEFFER,
F. W. BOND.